(12) United States Patent
Lin (10) Patent No.: US 11,135,819 B1
(45) Date of Patent: Oct. 5, 2021

(54) POLYPROPYLENE ENVIRONMENTALLY FRIENDLY ADVERTISING CLOTH

(71) Applicant: TAYA CANVAS (SHANGHAI) COMPANY LIMITED, Shanghai (CN)

(72) Inventor: I-Chien Lin, Shanghai (CN)

(73) Assignee: Taya Canvas (Shanghai) Company, Shanghai (CN)

(*) Notice: Subject to any disclaimer, the term of this patent is extended or adjusted under 35 U.S.C. 154(b) by 0 days.

(21) Appl. No.: 17/102,870

(22) Filed: Nov. 24, 2020

(30) Foreign Application Priority Data

Aug. 7, 2020 (TW) .................. 109126968

(51) Int. Cl.
*B32B 27/12* (2006.01)
*B32B 27/08* (2006.01)
*B32B 27/20* (2006.01)
*B32B 27/30* (2006.01)
*B32B 27/32* (2006.01)
*B32B 5/02* (2006.01)

(52) U.S. Cl.
CPC ............. *B32B 27/12* (2013.01); *B32B 5/02* (2013.01); *B32B 27/08* (2013.01); *B32B 27/20* (2013.01); *B32B 27/308* (2013.01); *B32B 27/32* (2013.01); *B32B 2250/04* (2013.01); *B32B 2250/246* (2013.01); *B32B 2307/3065* (2013.01); *B32B 2307/4023* (2013.01); *B32B 2323/10* (2013.01); *B32B 2333/04* (2013.01); *B32B 2451/00* (2013.01)

(58) Field of Classification Search
CPC .......... B32B 27/12; B32B 27/08; B32B 27/20
USPC ........................................... 428/198
See application file for complete search history.

(56) References Cited

U.S. PATENT DOCUMENTS

| 6,811,840 | B1* | 11/2004 | Cross | ................... | B44C 1/1712 |
| | | | | | 428/32.62 |
| 6,849,312 | B1* | 2/2005 | Williams | ............... | B44C 1/1729 |
| | | | | | 156/230 |
| 2018/0016744 | A1* | 1/2018 | Matsumoto | ............... | D06P 1/38 |

* cited by examiner

*Primary Examiner* — Betelhem Shewareged
(74) *Attorney, Agent, or Firm* — Rosenberg, Klein & Lee (57) ABSTRACT

A polypropylene environmentally friendly advertising cloth having a fabric base layer (20), which is a mesh braid made of Polypropylene woven by warp thread (21) and weft thread (22); a first waterproof and fireproof layer (30) and a second waterproof and fireproof layer (40) which are made by coating an aqueous polyacrylate coating slurry on the first surface (24) and the second surface (25) to form a thin film layer, the aqueous polyacrylate coating slurry penetrating the meshes (11); an ink-absorbing layer (50) which are made by coating a water absorption coating material that made of acrylic on the second waterproof and fireproof layer (40). The present invention is PVC free and non-toxic, so that it is particularly suitable for indoor advertising and interior decoration and fulfills the use for medical purposes.

9 Claims, 6 Drawing Sheets

POLYPROPYLENE ENVIRONMENTALLY FRIENDLY ADVERTISING CLOTH

BACKGROUND OF THE INVENTION

1. Field of the Invention

The invention relates to a polypropylene environmentally friendly advertising cloth, especially to one that is PVC free, non-toxic, and having the features of ink-absorbing, fireproof and waterproof.

2. Description of the Related Art

In the prior art, most of the materials used for the advertising or the parasols or awnings in shop were canvas, the canvas can perform the functions of display, sun protection and rain protection. The earliest woven PE canvas was made by interlacing longitudinal and transverse PE threads into a single-colored or stripe-colored fabric layer, since the fabric layer is not waterproof, a laminated layer is required for achieving the waterproof function. The laminated layer has the advantage of a low specific weight, but the laminated layer does not adhere easily to the surface of the fabric layer. In addition, the laminated layer is too thin, and its own material is not soft enough. If the PE canvas is folded or collided, the laminated layer at the fold point can easily be damaged or detached, and the PE canvas loses its waterproof function, which is the main disadvantage.

Figure 1:
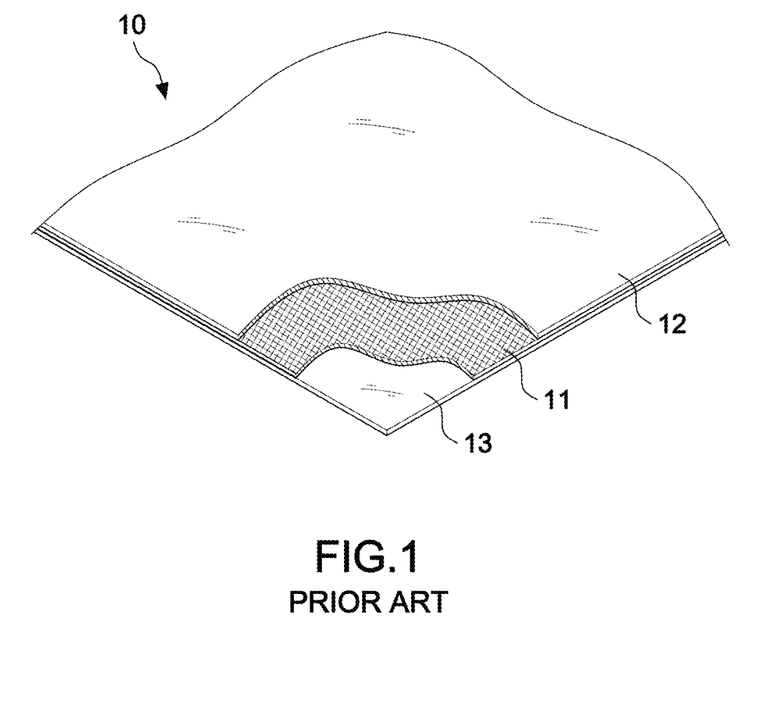
FIG. 1 is a schematic diagram illustrating the structure of PVC cloth in prior art.
Figure 2:
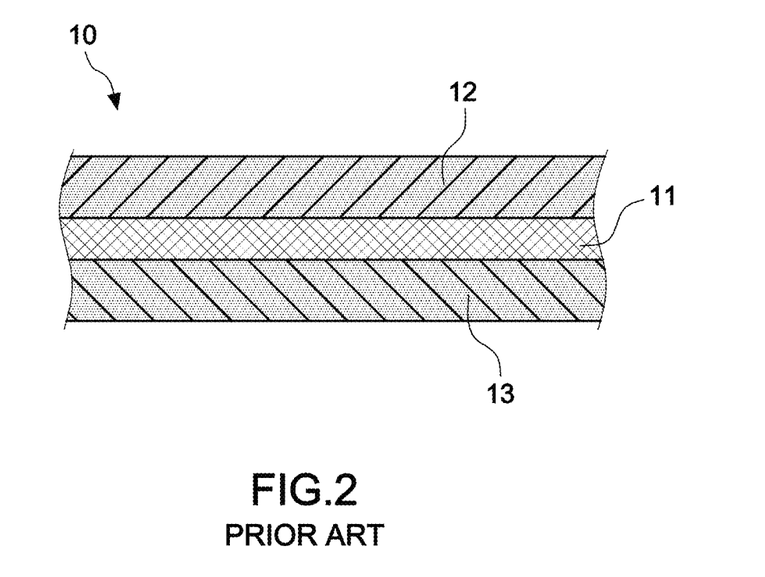
FIG. 2 is a perspective view of PVC cloth in prior art.

Referring to FIGS. 1-2, to solve this problem, a new kind of PVC canvas (10) was developed, it is formed by gluing or hot pressing a layer of PVC (12), (13) on the upper and lower surfaces of the fiber substrate layer (11) in the middle, it is waterproof, so it is also used as a waterproof sunshade and advertising wall covering, so it indeed solves the problem of PE wall covering being not durable and easy to get damaged; However, the specific gravity of PE wall covering is about 1, but the specific gravity of PVC wall covering is about 1.4, so its weight is more than 40% heavier than PE wall covering. PVC is the abbreviation of polyvinyl chloride. The Greenpeace International Organization calls it "toxic plastic", but because of its cheapness and convenient of manufacturing, it has become the second-largest general-purpose plastic whose output is second only to PE. It is widespread in our lives and threatens our environment and health.

Moreover, PVC is the only chlorine-containing plastic among the five general-purpose plastics [PE, PVC, PP, PS, ABS]. Since it contains chlorine, by adding plasticizer can adjust its softness. Except for plasticizers, the thermal stability of PVC is extremely poor, in order to avoid the cracking of PVC products under the sun or high temperature, stabilizers must be added, usually are heavy metals such as Lead, Cadmium, and Zinc. Therefore, PVC is not just PVC, but also contains some plasticizers and stabilizers that are harmful to health and the environment; PVC without adding anything at all is not poisonous, but it is also useless.

Greenpeace International Organization calls the PVC as "toxic plastic", is not because PVC itself that contains no additives, or it is not because PVC products that contain additives, but in their entire producing life cycle, from raw material mining to production, use and disposal, PVC is harmful to the environment and human health.

However, the present global outdoor advertising industry mostly adopts polyvinyl chloride coated mesh cloth as digital inkjet advertising cloth, as shown in the prior art patents CN2650286Y, CN2740400Y, and CN291192334Y, in these patents they use lots of polyvinyl chloride. Its usage continues to rise and has replaced most of other outdoor advertising methods. Outdoor advertising has always played an irreplaceable role in promoting market, guiding consumption, beautifying city, and creating urban atmosphere.

The advertising industry is an industry with rapid updates, so outdoor advertising has only a short period of use, ranging from half a year to several days. PVC coated mesh cloth that used as the digital inkjet advertising cloth is hard to recycle after used. PVC has bright color, corrosion resistance, strong durability, but poor thermal stability and light resistance. Hydrogen chloride begins to decompose when it is above 100° C. or exposed to long-term sunlight. Therefore, stabilizers, plasticizers, anti-aging agents, etc. must be added when manufacturing plastics to enhance its heat resistance, toughness, ductility, etc. The density of pure PVC is 1.4 g/cm$^3$, and the density of PVC added with plasticizers is generally 1.15~2.00 g/cm$^3$. These harmful additives and plasticizers in PVC may effuse or vaporize, and further interfere with biological endocrine, affect fertility, and increase the risk of having cancer. Therefore, some types of plasticizers have been listed as substances of high concern in EU countries, and their use is completely prohibited. Furthermore, PVC has the disadvantage of shrinking.

Furthermore, the general landfill methods for PVC coated mesh cloth after used are:

1. Separation: The disadvantage is that it is difficult to separate the PVC after being laminated to the mesh.
2. Landfill: The disadvantage is that the PVC itself takes decades to decompose, and the decomposed objects are harmful to the soil and water. 3. Incineration: The disadvantage is that PVC will release carcinogenic dioxin during the combustion process and pollute the air.

Therefore, the conventional PVC advertising cloth has above disadvantage needs to be improved.

SUMMARY OF THE INVENTION

Figure 3:
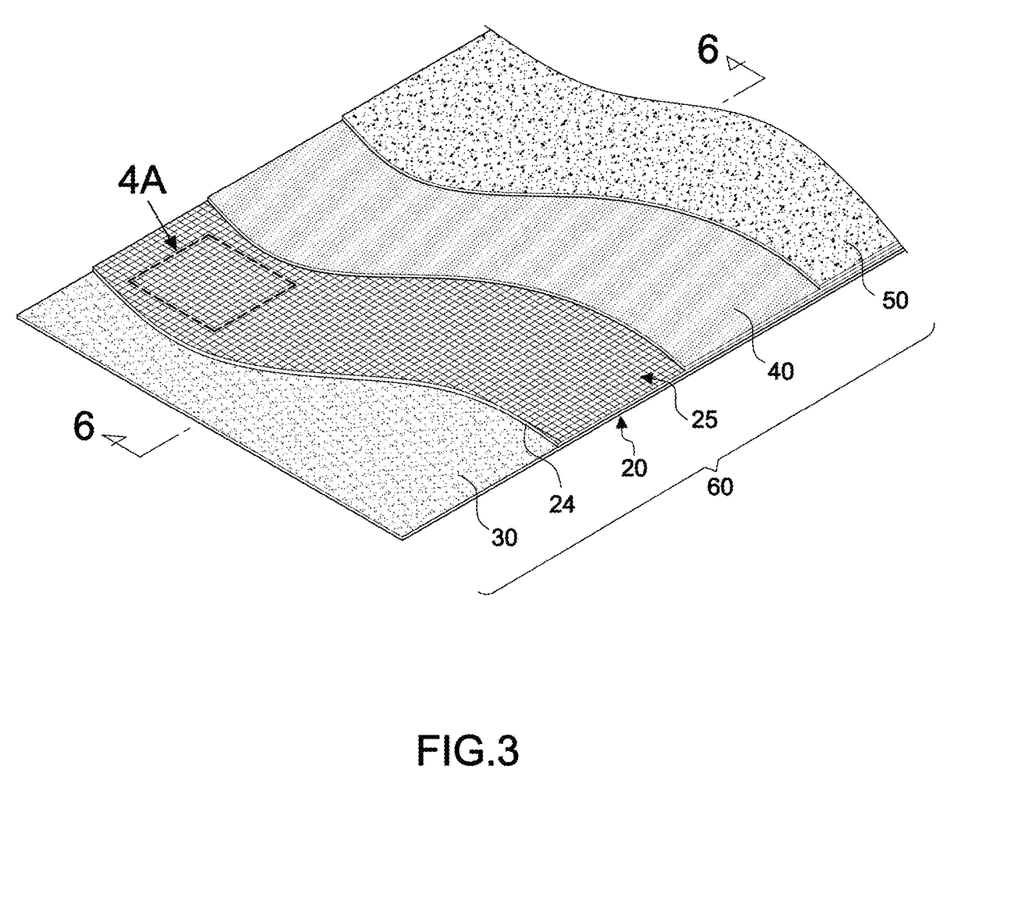
FIG. 3 is a perspective view of the structure of the applicable embodiment of the present invention.
Figure 4A:
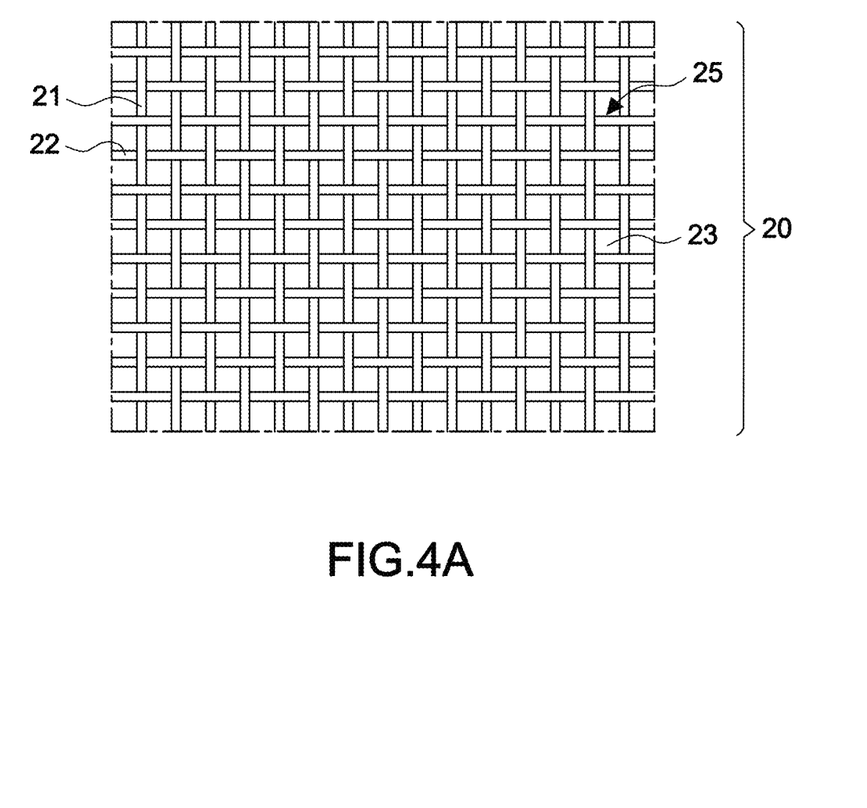
FIG. 4A is a zoom-in view of the 4A that indicating the fabric base layer in FIG. 3.
Figure 4B:
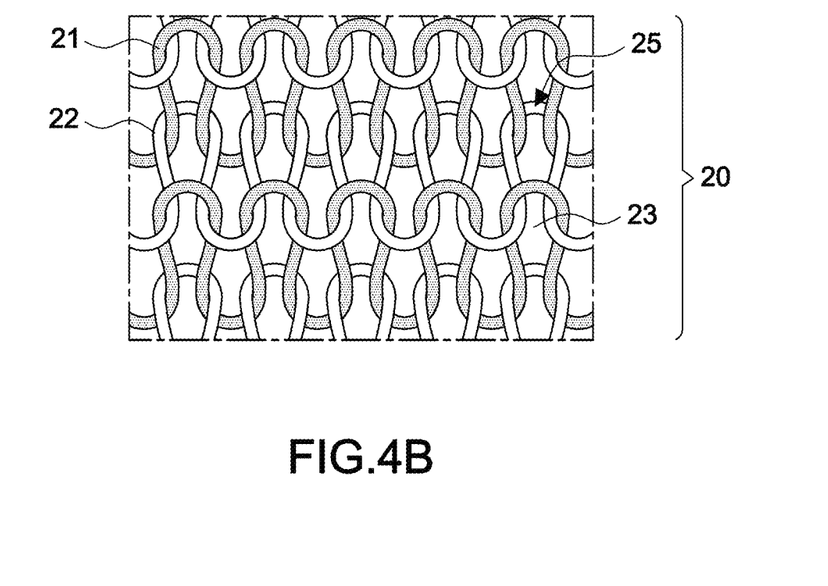
FIG. 4B is a zoom-in view of the fabric base layer in another applicable embodiment.
Figure 5A:
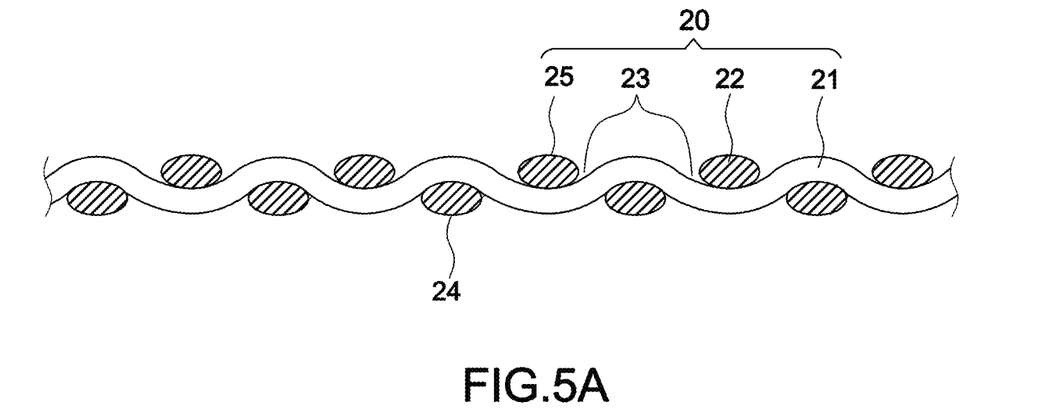
FIG. 5A is a sectional view of the fabric base layer.
Figure 5B:
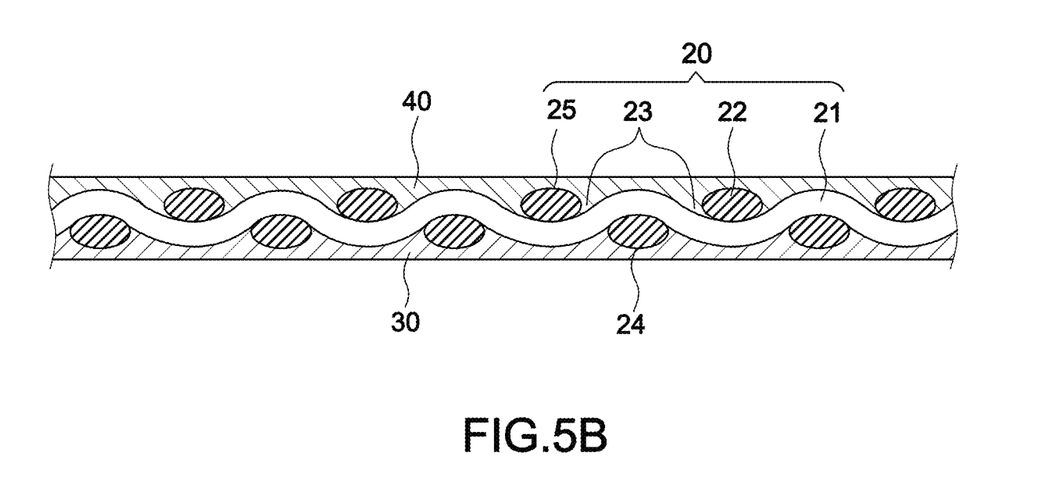
FIG. 5B is a sectional view of the polyacrylate coating slurry penetrating the fabric base layer.

Referring to FIG. 3, it is a primary objective of the present invention to provide a polypropylene environmentally friendly advertising cloth (60), which having waterproof, fireproof, and ink-absorbing composite structure on the fabric base layer (20) for making the cloth become PVC free and non-toxic structure.

It is another objective of the present invention to provide a polypropylene environmentally friendly advertising cloth (60), which having specific gravity smaller than 1, the inkjet advertising cloth made by this structure has reduced specific gravity for 35% compared to the PVC advertising cloth, and it is convenient to use and has the feature of waterproof.

Referring to FIGS. 4A-4B, 5A-5B, in order to achieve the above objectives, the polypropylene environmentally friendly advertising cloth (60), comprising: a fabric base layer (20), which is a mesh braid made of Polypropylene woven by warp thread (21) and weft thread (22), wherein the basic weight is about 120-155 g/m$^2$ and the thickness is 0.2-0.8 mm, and the fabric base layer (20) has multiple meshes (23) and has a first surface (24) and a second surface (25) on the opposite side of the first surface (24); a first waterproof and fireproof layer (30) and a second waterproof and fireproof layer (40) which are made by coating an aqueous polyacrylate coating slurry on the first surface (24) and the second surface (25) to form a thin film layer, the aqueous polyacrylate coating slurry penetrating the meshes (23) and covering the first surface (24) and the second surface (25) make the first waterproof and fireproof layer (30) and the second waterproof and fireproof layer (40) have the thickness between 0.2-0.8 mm; wherein the aqueous polyacrylate coating slurry is composed of below materials and all the combination is based on the sum of the content of all the material as 100 wt %: 100-130 g/m$^2$ slurry comprising: 50-65 wt % aqueous polyacrylate as main component, 20-30 wt % fireproof slurry, 7-10 wt % brightener, 3-10 wt % water, and 1-3 wt % assistant; therefore the basic weight of the environmentally friendly advertising cloth (60) is between 180-300 g/m$^2$.

Figure 6:
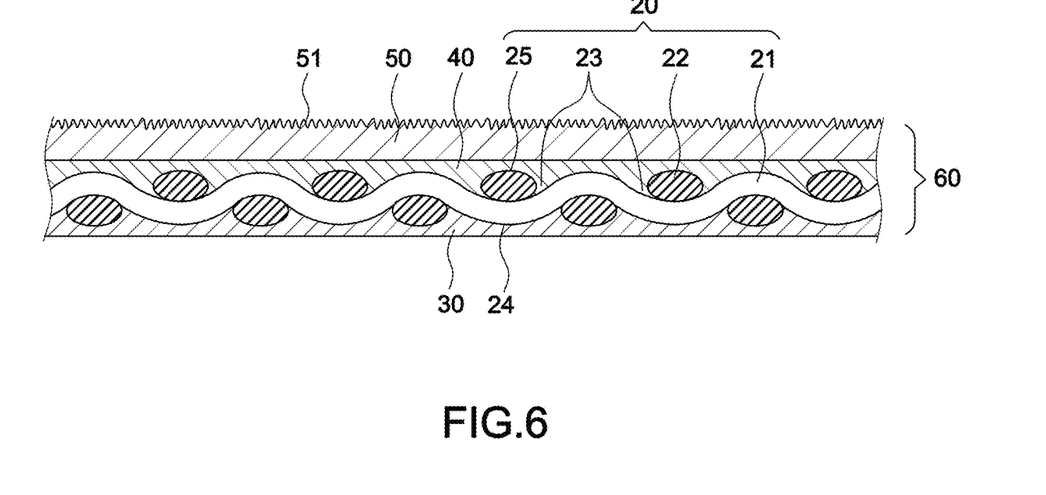
FIG. 6 is a sectional view of the applicable embodiment along line 6-6 in FIG. 3.
Figure 7:
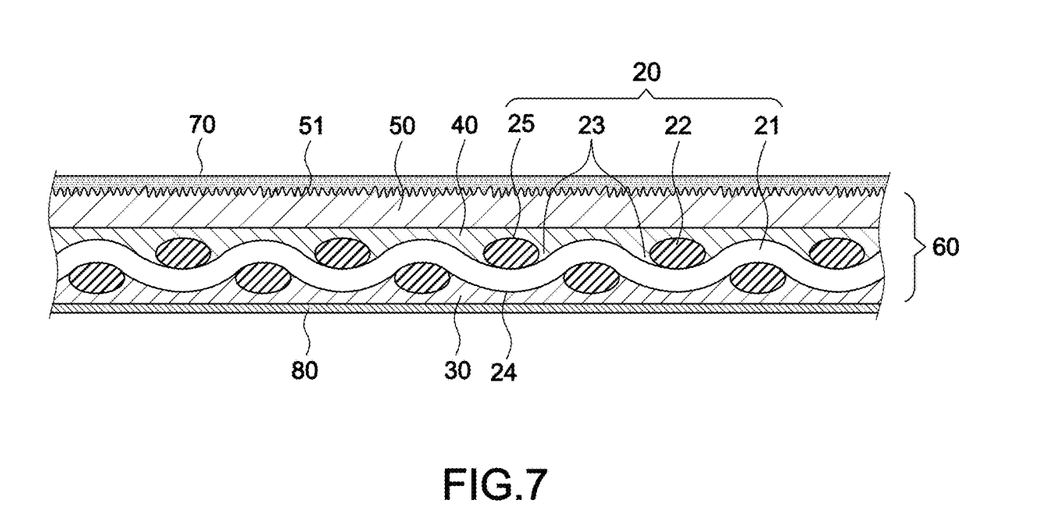
FIG. 7 is a sectional view of another applicable embodiment.

Referring to FIGS. 6-7, the present invention further comprising an ink-absorbing layer (50) which are made by coating a water absorption coating material that made of acrylic on the second waterproof and fireproof layer (40), the thickness is between 0.01-0.15 mm, a top surface (51) of the ink-absorbing layer (50) is for absorbing the ink of digital inkjet.

Also, the fireproof slurry including: phosphorus as main additive, antimony as main additive, bromine as main additive, sodium polyphosphate, mono-ammonium phosphate, antimony pentoxide, antimony trioxide, sodium antimonite, zinc borate, zirconia, diammonium phosphate, sulfamic acid, sodium amido sulfonate, boric acid, borate, or aluminum oxide hydrate, at least one is included thereof.

Also, the brightener includes an optical brightening agent, OBA.

Also, the assistant includes ultraviolet stabilizer, antioxidant, antistatic agent, or the combination thereof.

Also, the thickness of the best application of the fabric base layer (20) is 0.3 mm.

Also, the thickness of the best application of the first waterproof and fireproof layer (30) and the second waterproof and fireproof layer (40) is 0.3 mm.

Also, the thickness of the best application of the ink-absorbing layer (50) is 0.02 mm.

Also, the first waterproof and fireproof layer (30) can be coated with a blackout layer (80).

With the features disclosed above, comparing with the conventional PVC advertising cloth, the environmentally friendly advertising cloth of the present invention has the features of lighter weight, no irritating smell, harmless to the body, non-allergenic, and non-toxic. The present invention is suitable for many kinds of ink, the conventional PVC advertising cloth can be used in UV printing machine, Latex printing machine, Solvent Eco solvent printing machine, so does the environmentally friendly advertising cloth (60); Since the present invention does not add with any plasticizer, the storage life can reach more than one year. It can be buried and burned without causing major pollution. The coating is degradable and recyclable. The temperature resistance is −40☐~90☐ and other functions are also improved.

DETAILED DESCRIPTION OF THE PREFERRED EMBODIMENT

For better understanding of present invention, I provide the embodiment and drawing enclosed for detailed description. Those who skilled in the art can understand purpose, the feature and benefit of the present invention from the contents disclosed in this specification. Kindly noted that the present invention can be implemented or applied through other different specific embodiments and based on different viewpoints various details in this specification can be various changed without departing from the spirit of the present invention. In addition, the drawings attached to the present invention are merely a schematic illustration and they are not depicted in actual dimensions. The following embodiments will further describe the related technical content of the present invention in detail, but the disclosed content is not intended to limit the technical scope of the present invention.

Referring to FIGS. 3-8, in first applicable embodiment, an environmentally friendly advertising cloth (60), comprising:

a fabric base layer (20), which is a mesh braid made of Polypropylene woven by warp thread (21) and weft thread (22), wherein the basic weight is about 120-155 g/m$^2$ and the thickness is 0.2-0.8 mm, and the fabric base layer (20) has multiple meshes (23) and has a first surface (24) and a second surface (25) on the opposite side of the first surface (24); In this embodiment, the thickness of the best application of the fabric base layer (20) is 0.3 mm, but the present invention is not limited to such application.

A first waterproof and fireproof layer (30) and a second waterproof and fireproof layer (40) which are made by coating an aqueous polyacrylate coating slurry on the first surface (24) and the second surface (25) to form a thin film layer, the aqueous polyacrylate coating slurry penetrating the meshes (23) and covering the first surface (24) and the second surface (25) make the first waterproof and fireproof layer (30) and the second waterproof and fireproof layer (40) have the thickness between 0.2-0.8 mm; the thickness of the best application of the first waterproof and fireproof layer (30) and the second waterproof and fireproof layer (40) are 0.3 mm, but the present invention is not limited to such application.

Wherein the aqueous polyacrylate coating slurry is composed of below materials and all the combination is based on the sum of the content of all the material as 100 wt %: 100-130 g/m$^2$ slurry comprising 50-65 wt % aqueous polyacrylate as main component, 20-30 wt % fireproof slurry, 7-10 wt % brightener, 3-10 wt % water, and 1-3 wt % assistant; therefore the basic weight of the environmentally friendly advertising cloth (60) is between 180-300 g/m$^2$.

The aqueous polyacrylate coating slurry of the present invention has the feature of waterproof and fire retardance. The polyacrylate coating slurry is generally copolymerized by hard components, such as polymethyl acrylate, etc., and soft components, such as poly butyl acrylate, etc. The main monomer of the polyacrylate coating layer are acrylic acid, methyl acrylate, ethyl acrylate, butyl acrylate, etc. In order to improve its waterproof performance, acrylamide and acrylonitrile can be added if necessary, and the polymerization initiator is generally peroxide, such as potassium persulfate, etc. Therefore, the aqueous polyacrylate coating slurry of the present invention has below features: 1. Good sunlight and weather fastness and not easy to yellow; 2. Good transparency and compatibility, which is suitable for the production of colored coating products; 3. Good washing resistance; 4. Strong adhesion; 5. Low cost.

In this embodiment, the fireproof slurry including but not limited: phosphorus as main additive, antimony as main additive, bromine as main additive, sodium polyphosphate, mono-ammonium phosphate, antimony pentoxide, antimony trioxide, sodium antimonite, zinc borate, zirconia, diammonium phosphate, sulfamic acid, sodium amido sulfonate, boric acid, borate, or aluminum oxide hydrate, at least one is included thereof.

In this embodiment, the brightener includes an optical brightening agent, OBA; It can be composed of an optical brightening agent, a dispersing agent and water, wherein the optical brightening agent can be a stilbene triazine compound, and the dispersing agent can be a sodium methylene dinaphthalene sulfonate compound, but not limited. And use the optical effect of brightening agent to increase the whiteness of the environmentally friendly advertising cloth (60).

In this embodiment, the assistant includes: an ultraviolet stabilizer, an antioxidant, an antistatic agent, or the combination thereof.

Referring to FIG. 6, in this embodiment, further comprising an ink-absorbing layer (50) which is made by coating a water absorption coating material that made of acrylic on the second waterproof and fireproof layer (40), the thickness is between 0.01-0.15 mm, a top surface (51) of the ink-absorbing layer (50) is for absorbing the ink of digital inkjet; The thickness of the best application of the ink-absorbing layer (50) is 0.02 mm.

FIG. 7 is a sectional view of another applicable embodiment, the surface of the first waterproof and fireproof layer (30) can be coated with a blackout layer (80).

Figure 8:
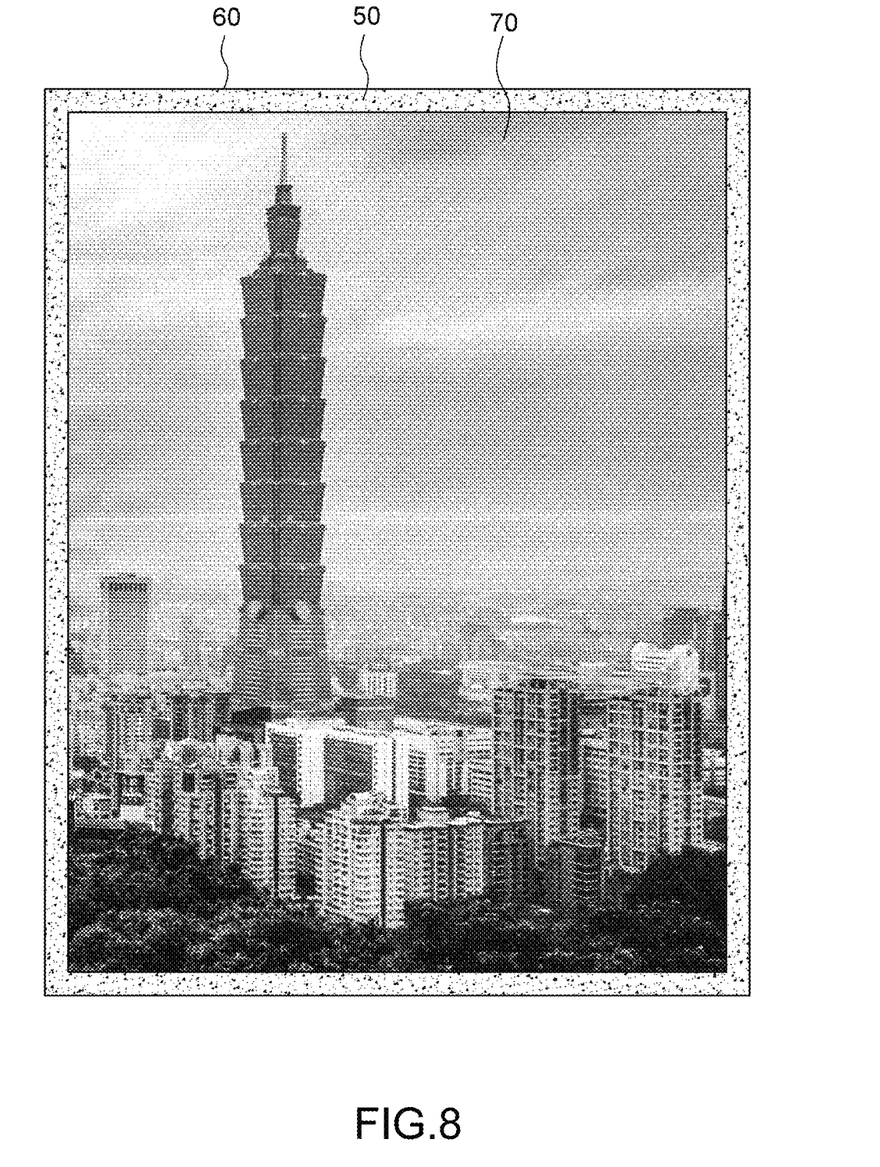
FIG. 8 is schematic diagram of the environmentally friendly advertising cloth of the present invention being printed.

FIG. 8 is schematic diagram of the environmentally friendly advertising cloth (60) of the present invention being printed with ink (70). Since the ink-absorbing layer (50) having the in-absorbing function, after printed with Ink (70), there is no need to spray the protective layer separately, and the visual effect and texture after spraying are better than the existing advertising cloth on the market.

The polypropylene fabric base layer (20) of the environmentally friendly advertising cloth (60) has multiple meshes (23), and the first waterproof and fireproof layer (30) and the second waterproof and fireproof layer (40) which are made by coating an aqueous polyacrylate coating slurry on the first surface (24) and the second surface (25) of the fabric base layer (20) to form a thin film layer, it is a non-toxic, odorless and tasteless milky white highly crystalline polymer. It is one of the lightest varieties of all plastics at present, with a density of only 0.90~0.91 g/cm$^3$, which is about 60% of the density of PVC; Among general-purpose plastics, polyacrylic resins have the best heat resistance, with a heat deformation temperature of 80-100° C., and at the same time have good stress cracking resistance and a high bending fatigue life. Furthermore, the ink-absorbing layer (50) is mainly composed of acrylic resin, which has an ink-absorbing characteristic in an appropriate ratio with the polyacrylic resin. Therefore, the environmentally friendly advertising cloth (60) of the present invention forms a composite structure with fireproof, waterproof, and ink-absorbing feature on the fabric base layer (20).

The above mentioned environmentally friendly advertising cloth (60) is composed of 120-155 gsm polypropylene fabric base layer (20) add with first formula, which is a aqueous polyamide coating slurry: 100-130 gsm slurry comprising 50-65% polyamide, 20-30% fireproof slurry, 7-10% brightener, 3-10% water, and 1-3% assistant.

In another embodiment, the environmentally friendly advertising cloth (60) is composed of 110-135 gsm polypropylene fabric base layer (20) add with second formula, which is a aqueous polyurethane coating slurry: 50-70 gsm slurry comprising 70-85% polyurethane, 10-25% water, and 1-2% hardener.

In another embodiment, the environmentally friendly advertising cloth (60) is composed of 100-120 gsm polypropylene fabric base layer (20) add with third formula, which is a aqueous polyurethane coating slurry: 50-70 gsm slurry comprising 70-80% polyurethane, 10-25% butanone, and 1-2% hardener.

In another embodiment, the environmentally friendly advertising cloth (60) is composed of 120-140 gsm polypropylene fabric base layer (20) add with fourth formula, which is a aqueous polypropylene coating slurry: 45-65 gsm slurry comprising 70-80% polypropylene, 10-25% water, and 1.5-2.5% hardener.

The common point of four formulas above mentioned is that PP mesh is used as the fabric base layer (20), and the first waterproof and fireproof layer (30) and the second waterproof and fireproof layer (40) are aqueous PA coating slurry formula, aqueous PU coating slurry formula, and PU coating glue formula, PP coating slurry formula, and all of them have been tested and they are able to be produced to the environmentally friendly advertising cloth (60); Wherein the ideal one is the first formula: fabric base layer (20) add with the aqueous polyamide coating slurry, and coated on the first surface (24) and the second surface (25) of the fabric base layer (20) to form the environmentally friendly advertising cloth (60).

The present invention has the following features and effects that need to be clarified:

The environmentally friendly advertising cloth (60) of the present invention has been tested by SGS testing company in Shanghai, the test results have reached the fire protection level "Class B" in the European standard for fire protection standards EN13501-1-B-s1-d0, and about the combustion performance of the product, wherein the additional level of smoke development is: "s1". The additional level of burning drops/particles is: "d0". Therefore, the environmentally friendly advertising cloth (60) of the present invention fits the European Union standards for higher fire safety, so that there is no doubt about its flame retardancy and fire resistance.

The structure of the environmentally friendly advertising cloth (60) of the present invention is PVC free and non-toxic, so that it is particularly suitable for indoor advertising and interior decoration and fulfills the use for medical purposes.

Compared to the conventional PVC advertising cloth in the current market, the structure of the environmentally friendly advertising cloth (60) has a weight reduction of almost 35%, so that it is light and soft, and it is easy to be attached and removed.

Moreover, the environmentally friendly advertising cloth (60) of the present invention has nice structure strength and can be processed with a predetermined molding machine to make the width (W) of the environmentally friendly advertising cloth (60) to be adjusted according to the customer's requirements. The maxima width (M) can reach up to 5 meters, therefore the environmentally friendly advertising cloth (60) has more applicability and selectivity.

The environmentally friendly advertising cloth (60) of the present invention is not only suitable for indoor advertising and indoor decoration, but also has passed the European TUV "Allergens" and "Skin Irritation" certification. The test report is as follows:

1. Allergens Test:

Test environment: room temperature 22° C.~26° C.; humidity: 50%~70%

Test basis: ISO 10993-10:2010

Sample name: 001-white wall covering

Test animals: 30 white guinea pigs, 302.4 g~362.8 g, male

Extraction medium: 1. 0.9% sodium chloride extraction medium 2. cottonseed oil

Negative control: same batch of extraction medium

Extraction Preparation: According 6 cm$^2$/ml ratio, 70° C., 24 h for producing two kinds of extraction medium Test method: maximum dose method Test steps: 1. Induction: The extract was injected symmetrically on the back of the animal One week after the injection, the injection area was applied with the extract for 48 hours.

Stimulation: the animal's ventral skin was applied with the extract and fixed for 24 h.

Judging indicators: 24 h and 48 h after removing the application, observe the erythema and edema reaction on the ventral skin.

Results: During the 48 h observation period, the skin response level of the control group was 0; the test group skin response level was 0, and there was no allergy.

Conclusion: According to the method of ISO10993-10: 2010, the skin allergens test results of the test sample extract meet the requirements.

2. Skin Irritation Test:

Test environment: room temperature 22° C.~26° C.; humidity: 50% to 70%

Test basis: ISO 10993-10:2010

Sample name: 001-white wall covering

Test animals: 6 healthy New Zealand rabbits, 2.3 kg~2.7 kg, male

Extraction medium: 1. 0.9% sodium chloride extraction medium 2. cottonseed oil

Negative control: same batch of extraction medium

Method of contact: skin application

Contact time: 24 h

Judging index: Observe the erythema and edema reaction of skin tissue at the contact site at 24 h, 48 h, 72 h.

Results: after removed the skin application for 24 h, 48 h, 72 h, the part of the skin tissue of the test sample that contacting 0.9% sodium chloride injection extraction solution has irritation index 0, (average scored is 0); the part of the skin tissue of the test sample that contacting cottonseed oil extraction solution has irritation index 0 (the average score is 0).

Conclusion: According to the method of IS010993-10: 2010, the skin irritation test results of the test sample extract meet the requirements.

Therefore, it can be confirmed from the above test report that the environmentally friendly advertising cloth (60) of the present invention meets the requirements of medical use, which is an effect that cannot be achieved by conventional PVC advertising cloth.

Compared with conventional PVC advertising cloth, the environmentally friendly advertising cloth (60) composed of polypropylene fabric base layer (20) has below improved effect:

1. The printing result of the environmentally friendly advertising cloth (60) of the present invention is similar to the conventional advertising cloth.

2. Under the same tenacity, the environmentally friendly advertising cloth (60) of the present invention is a half lighter than the conventional advertising cloth, and it is softer and easier to use.

3. The environmentally friendly advertising cloth (60) of the present invention is lighter so the size is smaller, then the transportation costs can be reduced.

4. The environmentally friendly advertising cloth (60) of the present invention withstand cold to minus 40° C. without adding any additives. Has passed the standard cold resistance test (ASTM D2136-2002).

5. Compared with conventional PVC advertising cloth, the PP environmentally friendly advertising cloth (60) has simpler production and lower energy consumption, and Polyvinyl chloride (PVC) is typical high energy consumption products, whether PVC is produced by calcium carbide method or ethylene method, the energy consumption and cost are high, which are not in line with the global trend of energy saving and emission reduction, and reuse of limited resources.

Also, the advertising cloth made of PP that after used still meets the environmental protection requirement:

1. The environmentally friendly advertising cloth (60) of the present invention can be easily recycled by shattering, and can be reproduced into other polypropylene production, such as product packaging case, flowerpots, inner lining of purses, etc.

2. The environmentally friendly advertising cloth (60) is not easy to produce air pollution after combustion.

3. The environmentally friendly advertising cloth (60) will not produce any toxic substances after landfilled.

Based on the above description, the comparison of the environmentally friendly advertising cloth (60) of the present invention and conventional advertising cloth is listed below:

|  | Environmentally friendly advertising cloth (60) | Conventional PVC advertising cloth |
| --- | --- | --- |
| Weight | 180 gsm-300 gsm | 200 gsm-900 gsm |
| Coating Material | PA | PVC |
| Coating auxiliary materials | Aqueous material | Plasticizer |
| odor | No pungent smell | Pungent chemical smell |
| Harmless to the body | REACH168,33P, Oeko-tex standard 100 | REACH168, 6P |
| Removal | Easy | Hard |
| Allergy | No | Unknown |
| Applicable type Ink | UV, Latex, Solvent, Eco solvent | UV, Latex, Solvent, Eco solvent |
| Shelf life | Since without plasticizer, it can be more than one year | About 6 months |
| Recycling | Can be landfilled or incinerated without causing major pollution, and the coating is degradable and recyclable | Landfill or incineration will cause bigger pollution, and the coating is not degradable and difficult to recycle |
| Temperature resistance | −40° C.~90° C. | −30° C.~70° C. |

With reference to the above comparison table can tell that the environmentally friendly advertising cloth (60) of the present invention has lighter weight, no pungent smell, harmless to human body, non-allergenic, non-toxic and is suitable for various kinds of ink; the conventional PVC advertising cloth is suitable for UV, Latex, Solvent, and Eco solvent printer, so does the environmentally friendly advertising cloth (60); Since there is no plasticizer being added, the shelf life can be longer than a year, landfilled or incinerated will not cause major pollution, the coating is degradable and recyclable, and the Temperature resistance is also improved to −40° C.~90° C.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A polypropylene environmentally friendly advertising cloth is an environmentally friendly advertising cloth (60) for digital inkjet printing, comprising:
    a fabric base layer (20), which is a mesh braid made of Polypropylene woven by warp thread (21) and weft thread (22), wherein the basic weight is about 120-155 g/m$^2$ and the thickness is 0.2-0.8 mm, and the fabric base layer (20) has multiple meshes (23), a first surface (24) and a second surface (25) on the opposite side of the first surface (24);
    a first waterproof and fireproof layer (30) and a second waterproof and fireproof layer (40), which are made by coating an aqueous polyacrylate coating slurry on the first surface (24) and the second surface (25) to form a thin film layer, the aqueous polyacrylate coating slurry penetrating the multiple meshes (23) and covering the first surface (24) and the second surface (25) make the first waterproof and fireproof layer (30) and the second waterproof and fireproof layer (40) have the thickness between 0.2-0.8 mm;
    wherein the aqueous polyacrylate coating slurry is composed of below materials and all the combination is based on the sum of the content of all the material as 100 wt %: 100-130 g/m$^2$ slurry comprising 50-65 wt % aqueous polyacrylate as main component, 20-30 wt % fireproof slurry, 7-10 wt % brightener, 3-10 wt % water, and 1-3 wt % assistant; therefore the basic weight of the environmentally friendly advertising cloth (60) is between 180-300 g/m$^2$.

2. The polypropylene environmentally friendly advertising cloth as claim in claim 1, wherein further comprising an ink-absorbing layer (50) which is made by coating a water absorption coating material that made of acrylic on the second waterproof and fireproof layer (40), the thickness is between 0.01-0.15 mm, a top surface (51) of the ink-absorbing layer (50) is for absorbing the ink of digital inkjet.

3. The polypropylene environmentally friendly advertising cloth as claim in claim 1, wherein the fireproof slurry including: phosphorus as main additive, antimony as main additive, bromine as main additive, sodium polyphosphate, mono-ammonium phosphate, antimony pentoxide, antimony trioxide, sodium antimonite, zinc borate, zirconia, diammonium phosphate, sulfamic acid, sodium amido sulfonate, boric acid, borate, or aluminum oxide hydrate, at least one is included thereof.

4. The polypropylene environmentally friendly advertising cloth as claim in claim 1, wherein the brightener includes an optical brightening agent, OBA.

5. The polypropylene environmentally friendly advertising cloth as claim in claim 1, wherein the assistant includes: ultraviolet stabilizer, antioxidant, antistatic agent, or the combination thereof.

6. The polypropylene environmentally friendly advertising cloth as claim in claim 1, wherein the thickness of the fabric base layer (20) is 0.3 mm.

7. The polypropylene environmentally friendly advertising cloth as claim in claim 1, wherein the thickness of the first waterproof and fireproof layer (30) and the second waterproof and fireproof layer (40) is 0.3 mm.

8. The polypropylene environmentally friendly advertising cloth as claim in claim 2, wherein the thickness of the ink-absorbing layer (50) is 0.02 mm.

9. The polypropylene environmentally friendly advertising cloth as claim in claim 1, wherein the first waterproof and fireproof layer (30) can be coated with a blackout layer (80).

\* \* \* \* \*